United States Patent

[11] 3,596,662

| [72] | Inventor | Lee R. Bolduc |
| | | Minneapolis, Minn. |
| [21] | Appl. No. | 757,232 |
| [22] | Filed | Sept. 4, 1968 |
| [45] | Patented | Aug. 3, 1971 |
| [73] | Assignee | Medtronic Inc. |
| | | Minneapolis, Minn. |

[54] ELECTRODE FOR CARDIAC STIMULATOR
1 Claim, 20 Drawing Figs.

[52] U.S. Cl. ................................. 128/418,
174/69, 174/72, 264/248
[51] Int. Cl. .................................. A61n 1/00
[50] Field of Search ......................... 174/69;
128/404, 418

[56] References Cited
UNITED STATES PATENTS

| 2,079,689 | 5/1937 | Gorton | 174/69 X |
| 3,333,045 | 7/1967 | Fisher et al. | 174/69 X |
| 3,348,548 | 10/1967 | Chardack | 128/418 |
| 3,466,742 | 9/1969 | Sinclair | 128/418 X |
| 3,421,511 | 1/1969 | Schwartz et al. | 128/418 |

FOREIGN PATENTS

| 485,078 | 7/1952 | Canada | 174/69 |

Primary Examiner—Channing L. Pace
Attorney—Lew Schwartz

ABSTRACT: An electrode having a pair of electrical conductors encapsulated in a unitary, homogeneous body of flexible nonconductive plastic material, such as silicone rubber. The electrical conductors are platinum alloy coil springs having spaced coils. The plastic body surrounds the coils and fills part of or the entire centers of the springs. The process of making the electrode utilizes a three-piece mold comprising a pair of identical female molds and a male mold. The female molds have elongated cavities of a size and shape of one-half of the plastic body covering the conductors. The male mold has elongated ribs which each have a volume equal to one-half of the volume occupied by the conductor coils plus one-half of any volume to be left void. The halves of the bodies are initially made by mounting the male mold in assembled relation with the female mold and injecting plastic into the mold cavity under high pressure. The male mold is then removed from the female mold exposing the grooves in the molded halves of the bodies. The conductors are then placed between the halves of the bodies in alignment with the grooves formed by the ribs of the male mold. The conductors are encapsulated in the body by combining the halves of the body into a one-piece member by simultaneously subjecting the assembled female molds to a high pressure and temperature sufficient to cause the plastic to flow between the coils of the conductors to fill the center portions of the conductors.

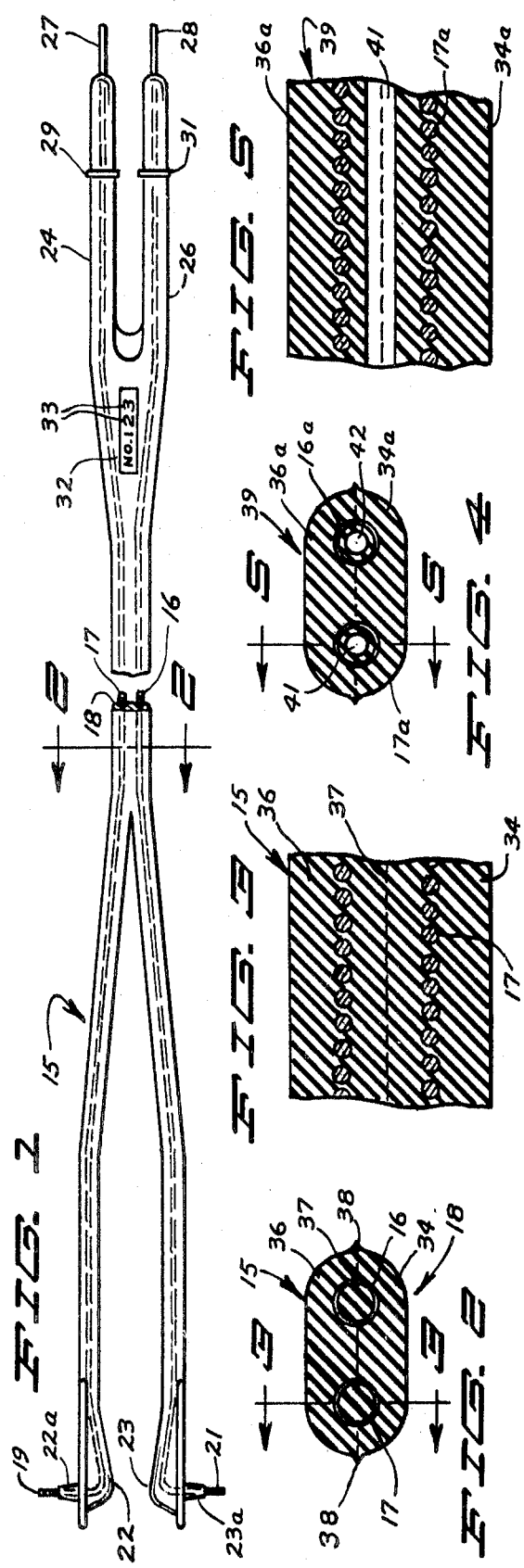

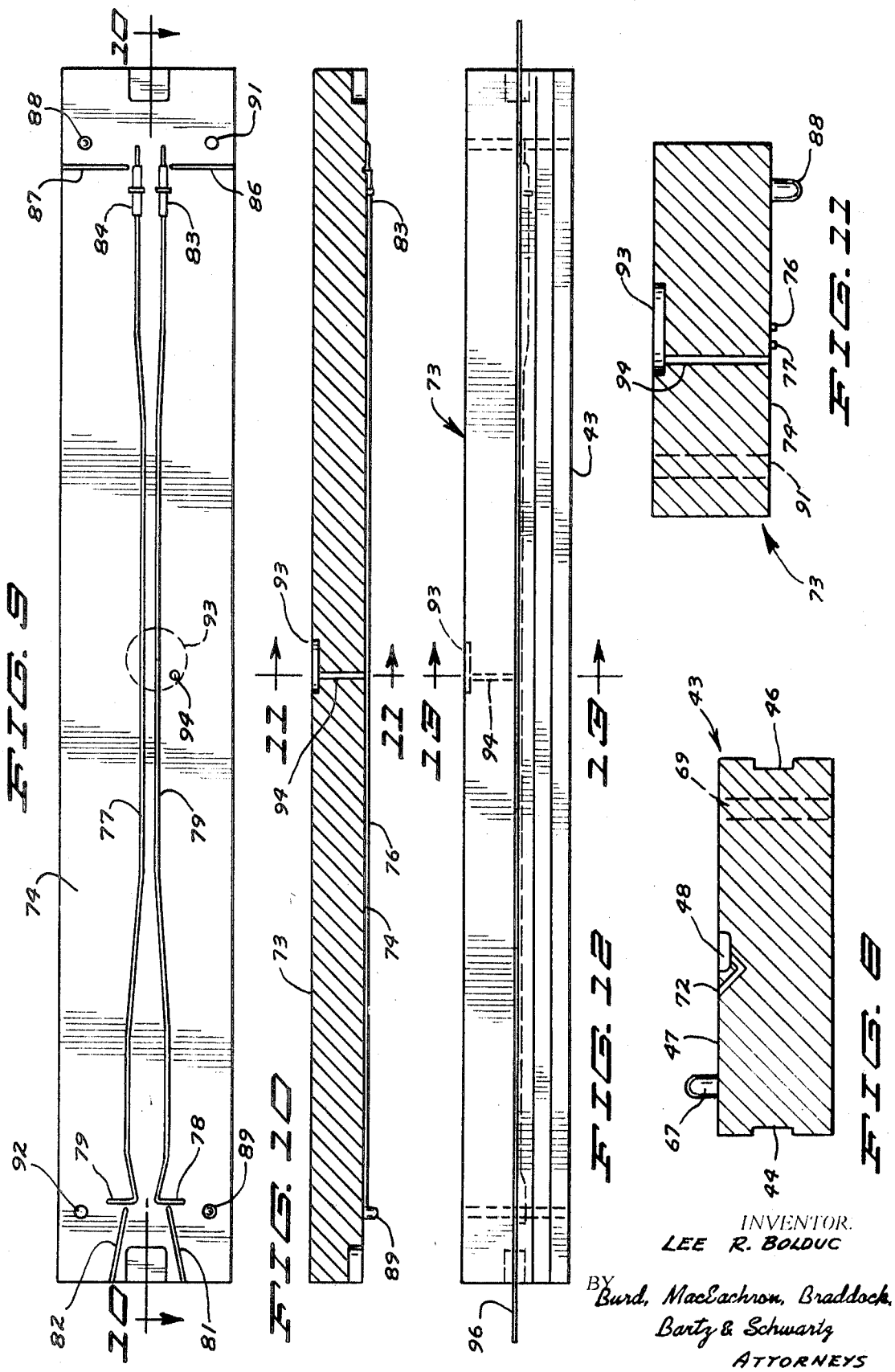

INVENTOR.
LEE R. BOLDUC

BY
Burd, MacEachron, Braddock,
Bartz & Schwartz
ATTORNEYS

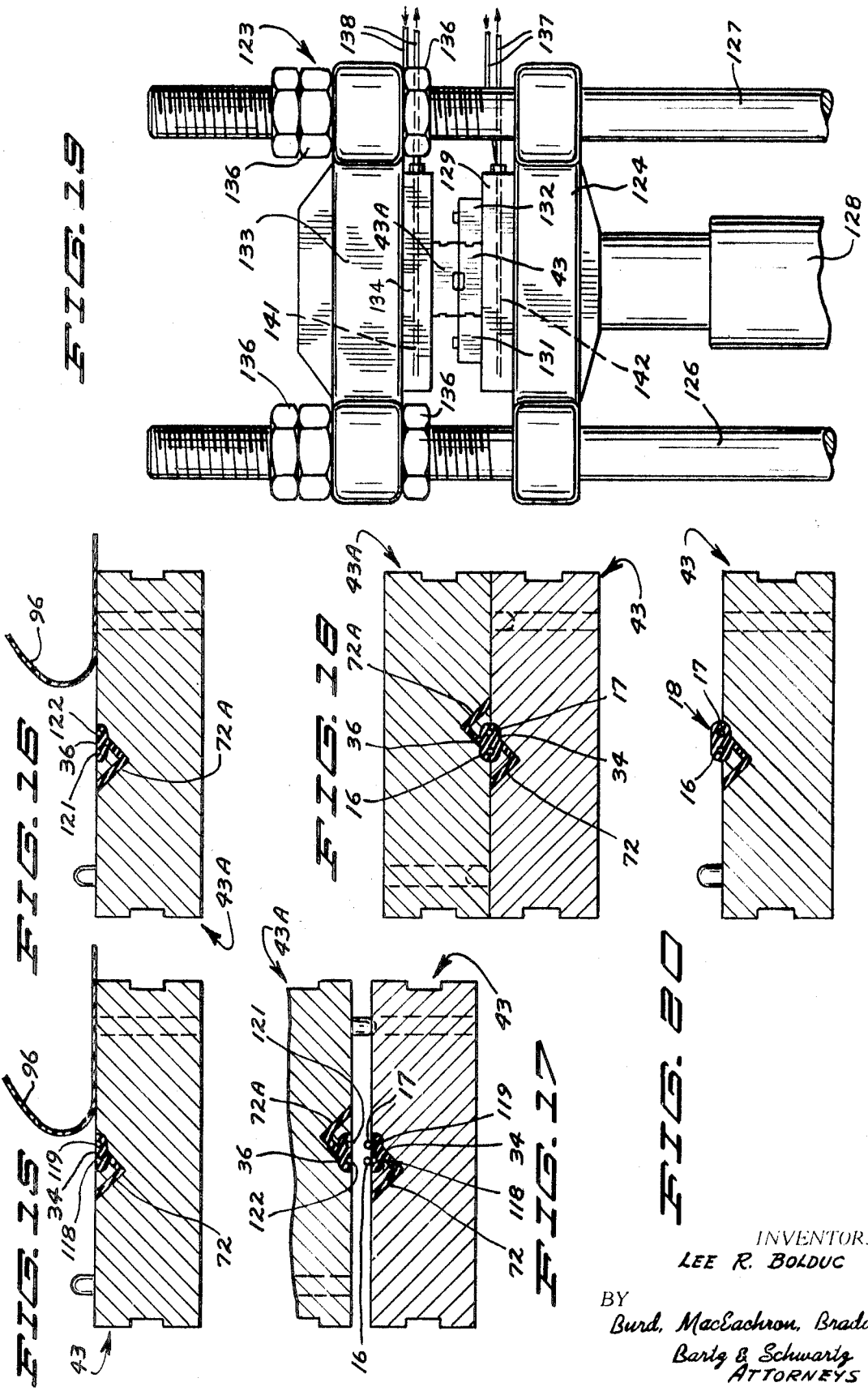

ELECTRODE FOR CARDIAC STIMULATOR

BACKGROUND OF INVENTION

Electrodes for cardiac and other electronic devices, as shown for example in Chardack U.S. Pat. Nos. 3,198,195 and No. 3,216,424, Greatbatch U.S. Pat. No. 3,057,356 and Bradley U.S. Pat. No. 3,236,240, are made by several step processes which require considerable time and labor. At present these electrodes are made by extruding a tube of plastic material having longitudinal cavities. The electrical conductor is threaded by hand into these cavities after the tube has been dilated. After the conductors are fed through the tube, the electrode contact structure, as shown in the Chardack U.S. Pat. No. 3,216,424, is molded to one end of the electrode. The opposite ends of the conductors are then surrounded or molded with plastic material such as silicone rubber, into a space configuration adapted to plugging into pacemaker electronics. In some electrodes the center of the electrical conductor is filled with a plastic material such as medical adhesive, by injecting plastic material into the conductor after it has been threaded through the tube. This injection of the plastic material must be done at low pressures to avoid the rupturing of the jacketing plastic material. Such prior art processes produce an electrode structure which is nonhomogeneous because two or more different materials have been used and which contains one or more interfaces between plastic materials which have been vulcanized at different times. The electrode and the method of making the electrode of the present invention utilizes compression molding techniques and pressure vulcanizing to form the entire electrode.

IN THE DRAWINGS

FIG. 1 is a foreshortened plan view of an electrode of the invention;

FIG. 2 is an enlarged sectional view taken along the line 2-2 of FIG. 1;

FIG. 3 is a sectional view taken along the line 3-3 of FIG. 2;

FIG. 4 is a sectional view similar to FIG. 2 showing a modified electrode;

FIG. 5 is a sectional view taken along the line 5-5 of FIG. 4;

FIG. 6 is a plan view of a female mold used in the process of making the electrode of FIG. 1;

FIG. 7 is a sectional view taken along the line 7-7 of FIG. 6;

FIG. 8 is a sectional view taken along the line 8-8 of FIG. 7;

FIG. 9 is a plan view of the male mold used in the process of making the electrode of FIG. 1;

FIG. 10 is a sectional view taken along the line 10-10 of FIG. 9;

FIG. 11 is a sectional view taken along the line 11-11 of FIG. 10;

FIG. 12 is a side elevational view showing the male mold in assembled relation with the female mold;

FIG. 15 is a cross-sectional view of the female mold carrying one-half of the electrode cover;

FIG. 16 is a sectional view similar to FIG. 15 carrying the other one-half of the electrode cover;

FIG. 17 is a cross-sectional view showing the assembling of the two female molds with the conductor members located between the cover halves;

FIG. 18 is a view of the female molds in assembled relation;

FIG. 19 is an elevational view of the vulcanizing press carrying the assembled female molds operable to simultaneously heat and apply pressure to the assembled female molds to effect the vulcanizing of the two halves of the cover; and FIG. 20 is a sectional view of one female mold carrying the completed electrode.

Figure 13:
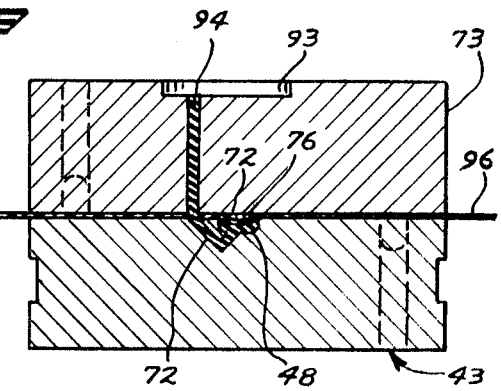
FIG. 13 is a sectional view taken along the line 13-13 of FIG. 12.

Referring to the drawings there is shown in FIG. 1, an elongated electrode indicated generally at 15 suitable for connecting an electronic heart-stimulating device to the heart. Electrodes used in this environment must withstand constant, rapid flexing over long periods of time and repeated lateral and axial flexing without fatiguing and elongation caused by body motion as well as the motion of the heart. Electrode 15 has a pair of electrical conductors 16 and 17 encapsulated in a flexible electrically insulated continuous and homogeneous body indicated generally at 18. Opposite terminal portions of the body are split into two parts or legs. The terminal portions 19 and 21 of the conductors project laterally from dome-shaped heads 22 and 23 having flat suture receiving flanges used to attach the electrode to the heart muscle. The terminal portions 19 and 21 project through laterally projected sleeves 22A and 23A. The opposite end of the electrode is bifurcated into a pair of legs 24 and 26. Projected longitudinally from the ends of the legs are cylindrical leads 27 and 28 used to connect the electrode to the pacemaker electronics.

The legs 24 and 26 adjacent the leads 27 and 28 have collars 29 and 31 which function as stops and seals for the connection to the pacemaker electronics package. The portion of the body 18 adjacent the commencement of the legs 24 and 26 has a slightly larger width and a central section having longitudinal recess 32 having molded electrode identification indicia or numbers 33.

As shown in FIGS. 2 and 3, the electrode 15 has a two-part body 18 comprising a base 34 and a cover 36 fused in face-to-face vulcanized relationship along the vulcanizing line 37 to form a single homogeneous body. The sides of the body have a thin flange 38 formed in the vulcanizing or fusing of the base to the cover and the imbedding of the conductors in the body.

The electrical conductors 16 and 17 are elongated coiled helical spring members having the coils spaced a small distance from each other to allow the material of the body to flow into the elongated central portion of the coils and thereby encapsulate all the coils in the material. A specific example of the material and properties of the spring conductors 16 and 17 is an electrically conductive material which has a low electrical resistance, as platinum-iridium alloy. This alloy can comprise 90 percent platinum and 10 percent iridium. The iridium is included to add resiliency to the platinum. This material is resistent to corrosion by body fluids. The material comprising the body is a vulcanizable flexible plastic material that electrically insulates the electrical connectors 16 and 17 from each other. As shown in FIG. 3, the conductors are laterally spaced from each other a distance of about twice the diameter of a conductor. A substantially uniform amount of plastic material is located adjacent the top, bottom and sides of the conductors 16 and 17. The body 18, formed from two identical molds of plastic material, does not adhere to body tissue. A silicone rubber can be used, such as Silastic 0372, obtainable from Dow Corning.

Referring to FIGS. 4 and 5, there is shown a modification of the electrode of the invention indicated generally at 39. The parts of electrode 39 which are identical with the parts of the electrode 15 are identified with the same reference numeral having a suffix A. Located longitudinally of the coil spring electrical conductors 16A and 17A are longitudinal passageways 41 and 42 which are formed in the vulcanizing process described hereinafter. The passageways 41 and 42 permit a stylet or stiff wire to be threaded into the electrode to provide the electrode with stiffness and maneuverability.

Referring to FIGS. 6, 7, and 8, there is shown a female mold, indicated generally at 43, used in the formation of the base of the body. An identical mold is used to form the cover of the body. Female mold is an elongated rectangular metal block having longitudinal guideways 44 and 46 in the sides of the block. The top of the mold has a smooth flat face 47 having a longitudinal mold cavity 48. One end of cavity 48 is bifurcated into separate passages and terminates in identical head recesses 49 and 51. Projected laterally from each recess are sleeve recesses 52 and 53 having reduced sized ends for accommodating the terminal portions of the electrical conductors 16 and 17. The opposite end of the cavity 48 has a transversely enlarged neck sector 54 joined to separate leg cavities 56 and 57. Directed longitudinally from the ends of legs 56 and 57 are electrode cavities 58 and 59 for receiving the leads 27 and 28. The central portion of the legs 56 and 57 have transverse semicircular recesses 61 and 62 for forming the collars 29 and 31.

Located in the midportion of neck 54 is a number plate 63 held in the mold by a magnet 64. The number plate is changed after each molding operation to provide the electrodes with sequential serial numbers.

Projected upwardly from the opposite ends of the mold are guide pins 67 and 68 and guide-pin holes 69 and 71 used to align the mating male mold on the female mold 43. The center section of the female mold has a gate passageway 72 opened to the cavity 48 and the mold face 47.

Referring to FIGS. 9, 10 and 11, there is shown a male mold, indicated generally at 73, used in cooperation with the female mold 43 used to form by an injection molding process the base of the body and the identical cover of the body. Mold 73 is an elongated rectangular metal block having a flat face 74. Projected upwardly from the face are a pair of longitudinal ribs 76 and 77. As shown in FIG. 11, ribs 76 and 77 have a rectangular cross section. The ends of ribs 76 and 77 have laterally outwardly projected ends 78 and 79 located adjacent outwardly directed air bleed grooves 81 and 82. The opposite ends of the ribs 76 and 77 have enlarged portions 83 and 84 to compensate for the increase in volume of the leads 27 and 28 of the electrode. Laterally projected air bleed grooves 86 and 87 are in the face of mold 27 and extend from the sides of the mold to a point closely adjacent the enlarged ends 83 and 84.

Projected upwardly from opposite ends of the male mold 73 are upright guide pins 88 and 89 located opposite guide pin holes 91 and 92. The guide pins 88 and 89 are in registry with the holes 69 and 71 in the female mold 43 and the holes 91 and 92 are in registry with the guide pins 67 and 68 of the female mold. The central section of the outer face of the mold 73 has a circular cavity 93 and a passageway or bore 94 connecting the cavity to the face 74. The hole 94 is in registry with the gateway passage 72 when the male mold 73 is in assembled relation with the female mold 43.

Figure 14:
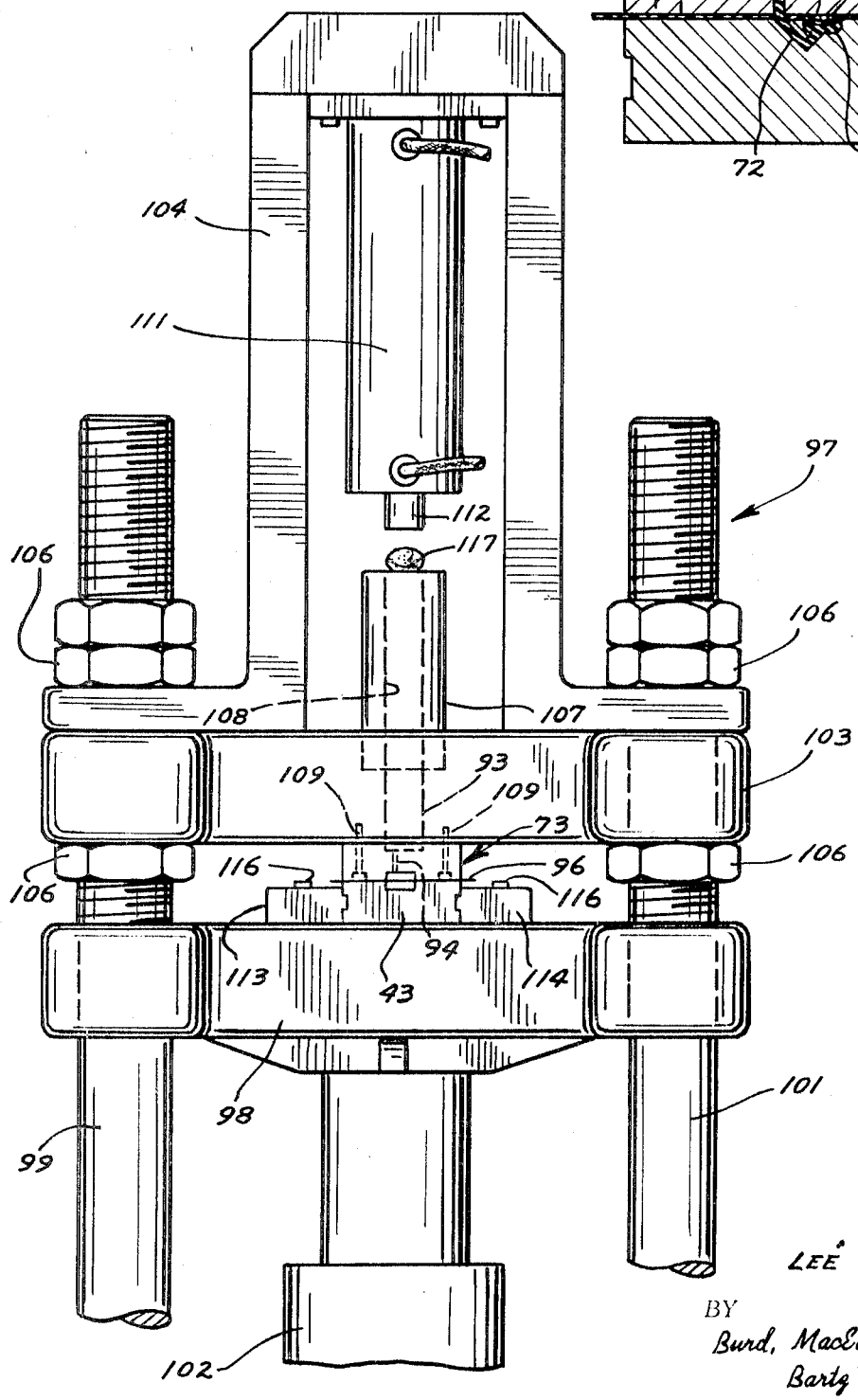
FIG. 14 is an elevational view of the male and female mold assembly mounted on a molding press.

As shown in FIGS. 12 and 13, a separation sheet 96, as a 1-mil polyethylene sheet, is interposed between the male and female molds prior to the insertion of the mold assembly into an injection molding machine indicated generally at 97 in FIG. 14. The injection molding machine 97 has a movable base 98 slidably supported on upright rods 99 and 101. A hydraulic ram 102 located below the base is operable to raise and lower the base 98 relative to a stationary platen 103. Positioned over the platen 103 is an inverted U-shaped yoke 104. Both the platen 103 and yoke 104 are adjustably mounted on the rods 99 and 101 by a plurality of nuts 106 threaded onto the rods 99 and 101. Secured to the center portion of the platen 103 is an upright cylindrical sleeve 107 having an upright passageway 108 which extends through the platen 103. The male mold 73 is mounted on the lower side of the platen 103 by a plurality of bolts 109 with the circular cavity 93 in alignment with the bottom of the passageway 108.

Mounted on the upper portion of the U-shaped yoke is a double-acting hydraulic ram 111 having a vertically movable plunger 112 in alignment with the passageway 108 in the sleeve 107 and platen 103. The female mold 43 is slidably secured to the base 98 by a pair of guide blocks 113 and 114 mounted on the base with bolts 116. The blocks have inwardly projected flanges or ribs which cooperate with the guideways in the sides of the mold to releasably hold the mold 43 on the base.

In the formation of one-half of the mold body, male and female molds are placed under a pressure by actuation of the hydraulic ram 102. A specific amount of uncured plastic material 117 is placed in the bore or passageway 108. On actuation of the double-acting cylinder 111 the plunger 112 forces the plastic downwardly through the passageway 108 and bore 94. The plastic material breaks the separation sheet 96 and moves through the gate 72 into the elongated cavity 48 of the female mold. The air in the cavity is forced out through the air bleed passageways 81, 82 and 87, 86 shown in FIG. 9. The plunger 112 moves to the bottom of the recess 93 forcing substantially all of the plastic material into the mold cavity to fill the entire cavity. Since the ribs 76 and 77 project into the mold cavity 48 the molded base will have longitudinal grooves 118 and 119 as shown in FIG. 15.

FIG. 16 shows the second female mold carrying the cover of the body formed with grooves 112 and 113 which are identical to the grooves 118 and 119. Male mold 73 is separated from the female mold by lowering the base 98. The separation sheet 96 is then stripped from the female mold to uncover the molded body or base shown in FIGS. 15 and 16.

As shown in FIG. 17, the electrical conductors 16 and 17 are placed on the base 34 in alignment with the grooves 18 and 19. The female mold 43A is then mounted in assembled relation with the female mold 43 to locate the electrical conductors in the aligned grooves 118, 122 and 119, 121. The entrances to gates 72 and 72A of the female molds are closed by the adjacent surfaces of the molds.

The assembled molds 43 and 43A are then placed in a vulcanizing press indicated generally at 123 in FIG. 19. The press 123 has a movable base 124 slidably supported on upright rods 126 and 127. A hydraulic ram 128 located under the base 124 is operative to raise and lower the base relative to a stationary platen 133. Mounted on the top of base 124 is a heater block 129 carrying guide blocks 131 and 132 slidably supporting the female mold 43. The stationary platen 133 carries a heater block 134 positioned over the heater block 129. A plurality of nuts 136 secure the platen 133 to the upper ends of the rods 126 and 127. The heater blocks 129 and 134 have pairs of lines 137 and 138 respectively connected to heater elements 141 and 142 in the heater blocks 129 and 134 respectively. The heating elements 141 and 142 can be electrical elements or tubular members for conducting heated fluids.

In the vulcanization or fusing of the base 34 to the cover 36 the hydraulic ram 128 forces the female molds 43 and 43A together under high pressure. This pressure is transferred to the plastic material forming the base and cover. The plastic material is simultaneously subjected to pressure and heated to a temperature sufficient to vulcanize or fuse the base and cover together to form a one-piece homogeneous body. The combined pressure and heating of the plastic is such that the plastic flows between the spaces between the coils of the electrical conductors and fills the entire center of the coiled spring electrical conductors 16 and 17. Since the pressures on the electrical conductors are substantially equal all around the conductors, the conductors will stay in alignment with the grooves in the base and cover without additional supporting structure so that the electrical conductors are encapsulated within the plastic material with substantially equal wall thickness throughout the electrode 15. The volume of the associated grooves 118, 122 and 119, 121 are substantially equal to the volume of the coiled wires of the conductors 16 and 17 so that the plastic material flows to totally encapsulate the electrical conductors 16 and 17 and fill the cores or center areas of the conductors as illustrated in FIGS. 2 and 3.

By changing the size of the ribs 76 and 77, the size of the grooves in the base and cover will be changed. If the size of the ribs 76 were increased, the grooves become larger with the result that there would be less plastic material available to flow into the center portions of the coiled electrical conductors 16 and 17. On application of heat and pressure through the use of the vulcanizing press 123 the material will flow between the coils of the conductor and leave a center passageway. This structure is illustrated in FIGS. 4 and 5.

In the vulcanizing operation, the terminal portions 19 and 21 of the conductors are placed in the grooves formed by the turned ends 78 and 79. The opposite ends of the conductors are placed in the recesses formed by the enlarged ends 83 and 84. The entire electrode is supported on the base independently of separate mold supports. In this manner the entire conductor can be surrounded and encapsulated in plastic material in a single operation.

In a specific example of molding of Silastic 0372, the uncured material is injected into the female mold cavity with the molding machine 97 under pressure of approximately 30 tons. Under this pressure the plastic material flows into the mold cavity 43 and fills both the head recesses 49 and 51 and the legs 56 and 57. The plastic material is formed with the pair of grooves which follow the outline of the ribs 76 and 77 of the male mold 73. The curing and vulcanizing of the plastic material is done in the vulcanizing press 123 by subjecting the assembled female molds 43 and 43A to a clamping pressure of 30 or more tons simultaneously with the heating of the molds. The molds are heated for a period of 10 minutes at 375° F. The vulcanizing time and temperature as well as the pressure will vary with the particular type of material which forms the body 18 around the electrical conductors 16 and 17.

While there have been shown and described a preferred embodiment of the electrode and the molds used in the process of making the electrode and the process of making the electrode, it is understood that various changes in the article, mold and process may be made by those skilled in the art without departing from the spirit of the invention. For example, the molding and fusing process can be used to encapsulate objects or members other than electrodes in fusible material.

The embodiments of the invention in which an exclusive property and privilege is claimed are defined as follows:

I claim:

1. An electrode, comprising:
   a. a pair of elongated helical spring electrical conductors having spaced coils, and
   b. a unitary, homogenous body of silicone rubber enclosing the conductors, extending between the spaced coils of the conductors to encapsulate the coils, the silicone rubber having a passageway extending along the longitudinal axis of each conductor and bifurcated ends with a conductor imbedded in each end.